3,541,105
**PROCESS FOR OBTAINING THE PRINCIPAL ALKALOID OF THE PLANT *TUPA PORTORICENSIS* VATKE**
Esteban Nunez Melendez, University Station, Box 21301, Rio Piedras, Puerto Rico 00931
No Drawing. Filed June 29, 1967, Ser. No. 649,855
Int. Cl. C07d 29/20
U.S. Cl. 260—294.7
2 Claims

ABSTRACT OF THE DISCLOSURE

The present invention is directed to alkaloids and derivatives which are derived from an endemic plant of Puerto Rico which is commonly referred to as "tibey tupa" and scientifically classified as *Tupa portoricensis* Vatke. The alkaloids are obtained by extraction utilizing suitable solvents which separate the alkaloids from the plant. The alkaloids and their derivatives are particularly useful as respiratory stimulants in specific cases where normal respiration has been impaired.

BACKGROUND OF THE INVENTION

The endemic plant of Puerto Rico, commonly called "tibey tupa" and scientifically classified as *Tupa portoricensis* Vatke of the lobelia family has been described and discussed in a number of publications. Reference to this plant can be found in the "Catalogue of the Common and Scientific Names of Some Plants of Puerto Rico," second edition, Bulletin #37 of the year 1945 published by the Agricultural Experiment Station of the University of Puerto Rico, Rio Piedras, Puerto Rico. The name of the plant bears the number 2756 and is referred to on page 166 of that book. In addition it is mentioned in other sections of this publication. The plant is also described in the publication entitled "Scientific Survey of Puerto Rico and the Virgin Islands" by N. L. Britton, Percy and Wilson, which was published by the New York Academy of Science during the years of 1923 through 1930. The plant, which belongs to the Lobeliaceae family, is also described in Linnaea; 38:727, 1874 under the scientific name *Tupa portoricensis* Vatke and in Symb. Ant. 1:453, 1899 under the name *Lobelia portoricensis* Urban.

The alkaloid or principal organic compound of alkaloidal nature which is the subject of the present application, although it is obtained from all parts of the above-mentioned plant in different quantities, was extracted primarily from the leaves of said plant by means of a procedure which will be described.

The alkaloids and the derivatives thereof have been found to be very useful as respiratory stimulants particularly in cases of asphiyxia neonatorium, that is, where there has been an impairment of respiration due to noxious gases (particularly carbon monoxide), impairments due to hypnotics or the use of narcotics and particularly in cases where respiratory impairment arises during the administration of general anesthesia.

The alkaloid can be administered subcutaneously, intravenously or intramuscularly. Various pharmacological studies have been performed using the alkaloids as obtained by the present invention and through these studies the preferred and safe dosage levels have been determind. Descriptions of the chemical characteristics and the results of the pharmocological studies are set forth following the specific embodiment of the invention.

SPECIFIC EMBODIMENTS

Leaves of various tibey tuba plants were carefully collected being certain that the plants belonged to the same species of plant. Precaution was taken so that no foreign extraneous matter were present on the leaves. Once collected, the leaves were carefully dried at a temperature which does not permit the decomposition or deterioration of the chemical constituents or vegetable organic constituents present in the leaves. Once the leaves were dried, they were reduced to a powder of uniform fineness.

Procedure for the extraction of the total alkaloids from the leaves

The preferred solvent, sulfuric ether, was used for the extraction of the alkaloids, although other equivalent solvents can also be utilized.

An adequate portion of the powdered leaves (200 grams) was carefully placed in an extraction paper thimble and inserted in a Soxhlet extractor. For the purpose of extraction, however, any other extraction apparatus can be used. A mixture of ammonia, ethyl alcohol and sulphuric ether in the proportions of 8 mls., 10 mls., and 20 mls. respectively was added to the powdered leaves. The proportions of any of these reagents can be changed depending, of course, upon the total amount of alkaloids to be extracted. In addition, various reagents which are functionally equivalent to those specified can be used.

Sulphuric ether extractions were continued until the leaves were free of alkaloids, that is, when the known chemical tests for alkaloids were performed, the last ethereal extraction was not positive. Practically all the alkaloids present in the leaves are extracted by this method.

The ethereal extractions were carefully evaporated to dryness in a water bath at a very low temperature. Additional portions of sulfuric ether, ethyl alcohol and 0.5 normal sulfuric acid, although any other concentrations approximating that specified can be used) are added to the material obtained. The other two solvents, the sulfuric ether and the alcohol can be substituted also by other equivalent solvents and, of course, the quantities utilized can be varied.

The sulfuric ether and the alcohol are then evaporated off utilizing a water bath. Once the presence of ether and alcohol is not detected by their characteristic odor, the mixture of alkaloidal salts and vegetable material is filtered through a filter paper and the filtrate collected in a separatory funnel. Additional extractions and formations of salts in the original container bearing the plant remnants were repeated using the same solvents, i.e., sulfuric ether, ethyl alcohol and 0.5 normal sulfuric acid. Evaporations in a water bath were performed until a small portion of the last of the acid extractions gave a negative test for alkaloids using the common alkaloidal reagents. That is, the alkaloids extracted in the leaves had been converted to alkaloidal salts. Each portion was filtered through an adequate filter paper and the clear filtrates collected in the separatory funnel.

To the acid portions in the separatory funnel, ammonium hydroxide was added until all of the alkaloids present therein were precipitated and the resulting mixture was slightly alkaline. Other alkaline solutions can also be used so long as they precipitate all of the alkaloids extracted.

The precipitated alkaloids now dissolved in alkaline solution were extracted with portions of sulfuric ether by adding the ether to the solution in the separatory funnel. The separatory funnel was shaken to facilitate the extraction and the precautions necessary with this solvent were taken. Any other immiscible solvent which extracts the total alkaloids, converted into basic alkaloids with the addition of the alkali, in this case ammonia, can be used. The ethereal portions of the alkaloids were poured in another separatory funnel and the extractions continued until the last ethereal portions gave a negative or no reaction with the commonly known alkaloid reacting reagents.

The ethereal portions of the alkaloid collected in the separatory funnel contained the alkaloids in a basic chemical form. The alkaloid was then converted into its salt form for purification by using 0.5 normal sulfuric acid. Of course, other concentrations of the sulfuric acid can be used as well as other acids which will perform similarly so long as the alkaloids are not undesirably affected. An adequate portion of 0.5 normal sulfuric acid was added. The separatory funnel was agitated so that the basic alkaloids in the immiscible solvent, ether in this instance, were converted into purer forms. The aqueous acidic portion was poured into another separatory funnel. Numerous portions of 0.5 normal sulfuric acid were used; each portion was filtered and the filtrate in each instance was collected in the separatory funnel. The last portion was tested in order to be sure that no alkaloids were left in the solution.

The acidic portion in the separatory funnel was made slightly alkaline by the addition of ammonium hydroxide. The alkaloidal salts in this manner were converted into basic alkaloids. The alkaloids were precipitated in their basic form by means of the ammonium hydroxide or by means of any other equivalent alkaline compound. The total alkaloids were extracted with successive portions of sulfuric ether, although any other effective immiscible solvent can be used. The basic alkaloids were extracted by the addition of successive portions of the sulfuric ether. The separatory funnel was shaken in each instance and the phases obtained were separated and collected in the appropriate flasks. The ethereal extractions were continued until the last portion collected gave a negative reaction with the usual alkaloid reacting reagents. The ethereal portions contain the total alkaloids in their basic chemical form.

The procedure for the conversion of the basic alkaloids to their salts can be repeated and the acid portions separated as earlier explained. These alkaloidal salts can then be converted to the respective basic alkaloids and separated with successive portions of ether in order to obtain a purer form of the compound.

The ethereal solution of the total alkaloids finally extracted in their basic form was slowly evaporated in vacuum at a temperature of from about 35 to 40° centigrade in the water bath until the solution in the flask was reduced approximately to one-third of its original volume. The temperature of the water bath was then immediately reduced to about 15 to 20° centigrade and the evaporation continued. The white precipitate of the alkaloid extracted from the leaves was in a crystalline form and more specifically, in the form of prismatic needles which separated from the ethereal solution and collected on the walls and on the bottom of the flask. Evaporation was continued until the original volume was reduced to one-eighth. The principal alkaloid was almost completely precipitated and the ethereal solution remaining in the flask contained the rest of the alkaloids present in the leaves.

Evaporation was carefully stopped so as to prevent the evaporation of the remaining portion of the ethereal solution and the crystallization of the remaining alkaloids. The ethereal solution was immediately poured into a small flask and covered. The precipitated crystals were washed in the original flask with a small portion of sulfuric ether in order to eliminate possible traces of the other alkaloids which might be precipitated by the gradual evaporation of the ethereal solution or of ethereal solution which remains on the walls of the flask after the remaining portion of the ethereal solution was poured into the small flask. These portions of ethereal washings of the crystals and of the walls of the original flask were added to the small flask in which the initial ethereal solution of the alkaloids was poured. This ethereal solution was cautiously evaporated to dryness. The rest of the alkaloids extracted from the leaves were collected in this manner.

In order to obtain a mixture of all the alkaloids present in the leaves so as to use it for chemical comparisons in a chromatographic procedure, which will be described later, the procedure used for the extraction of the powdered leaves an be repeated but in this case when the last step of the procedure is reached in the crystallization of the principal alkaloid, evaporation in vacuum at the temperature of 35° to 40° centigrade is continued until all of the solvent is evaporated. Only a small portion of the powdered leaves (ex: 10 gm.) is used in this instance since the sole purpose is to obtain a relatively small portion of all the alkaloids present in said leaves.

The materials obtained according to the above-described procedure can then be catagorized as follows:

(A) A portion of the principal alkaloid which initially crystallized;

(B) The alkaloids remaining in the small flask; and (C) a mixture of all the alkaloids present in the leaves, which was obtained when the procedure was repeated using only a small portion of the powdered leaves and when the ethereal solution was evaporated to dryness.

In order to determine and/or to confirm the presence of the principal alkaloid, as well as of the rest of the alkaloids present in the powdered leaves which were extracted and labeled respectively A, B and C as above set forth, paper chromatography studies were performed.

The procedure of paper chromatography as usually employed was followed and in this case a rectangular chromatographic jar was used. The paper used for this chromatographic procedure was the one manufactured by Carl Scheibler & Schull, of Einbeck, Germany, quality number 2043–B (thick). However, any other paper of different manufacturer which is equivalent to that specified can be used.

The paper was impregnated with a liquid phase consisting of a mixture of 9 volumes of formamide, 1 volume of concentrated formic acid and ammonium formate in sufficient quantity to make a saturated solution of said organic compound in the formamide which saturated solution was filtered through a filter paper. The formic acid is added to the filtered saturated solution.

The paper was saturated for 3 minutes with an adequate portion of the fixed liquid phase by wrapping the paper and placing it in an adequate cylindrical container bearing the solution. After the paper was saturated, it was taken from the container and placed between two sheets of filter paper for a period of five minutes during which period the paper was dried.

In the lower portion of the dried impregnated paper and according to the usual manner, small portions which were equivalent to various milligrams of the extracted materials, designated as A, B and C above were placed by means of a microburette. Each portion was equidistant from the next one. The three portions were in a horizontal relationship in the lower part of the narrow part of the paper. The solutions of the materials A, B and C were prepared by dissolving respectively a small portion of each material, equivalent to various milligrams, for example, 5 milligrams for each 10 micromilliliters, in a respective portion of ether saturated with formamide. The respective portions A, B and C consisted of, as explained before, the following material:

(A) The principal alkaloid crystallized;

(B) A mixture of the rest of the alkaloids; and (C) a mixture of all the alkaloids present in the leaves, which was obtained when the procedure was repeated with a small portion of the powdered leaves and the ethereal solution evaporated to dryness without any interruption.

The mobile phase used for the resolution or separation of the alkaloids in the paper used in his chromatographic procedure, consists of a mixture of benzene (benzol) and chloroform in equal parts. A portion of this mixture was placed in the chromatographic jar. The paper impregnated with the alkaloidal portions A, B and C was placed inside with the inferior part in the container with the mobile phase and the upper part suspended from the cover of the jar.

The chromatographic procedure took place smoothly in a period of time which varied from four to six hours at a temperature from 24 to 25° centigrade. The chromatogram obtained was dried in an oven at a temperature between 85 and 95° centigrade for approximately one hour or until it did not give the characteristic odor of the organic compounds used in the "fixed" and "mobile" phases.

Dragendorff alkaloidal reagent with Munier's modification was used to develop the chromatogram, that is, to precipitate the alkaloids separated in the chromatographic paper, so as to make them visible with the characteristic "orange" color of the reagent. The preparation of this Dragendorff reagent with Munier's modification is described in the book "Thin Layer Chromatograph" by Kurt Randerath of the year 1963, English translation by D. D. Libman and published by Academic Press, New York and London.

In the first series of "spots" of the chromatogram, at the bottom of which was placed a small fraction of the crystallized alkaloid (portion A) dissolved as specified in a small portion of ether saturated with formamide, it was observed that the principal alkaloid moved to the upper part of the chromatogram. No other spot was observed underneath, that is, no other alkaloid (which might appear with the characteristic "orange" color) was precipitated with the reagent. It was clear from this observation that the crystallized alkaloid was obtained in a substantially pure state, and free of the other alkaloids present in the rest of the ethereal solution which was poured into the small flask together with the washings and evaporated to dryness (portion B).

The second series of "spots" or precipitated alkaloids were those of the fraction of an ethereal solution saturated with formamide of the rest of the alkaloids (portion B). It was observed that the series of "spots" (precipitated alkaloids in a colored form with the Dragendorff reagent) was free of any "spot" in the upper part at the same level as the "spot" of the first line of the chromatogram and which "spot" corresponds to the principal alkaloid. That is, this portion B which contains the rest of the alkaloids does not contain any quantity of the principal alkaloid. This was confirmed by the observation of the second series of "spots" in the chromatogram. The "spots" present are localized in a much lower position than the principal alkaloid and they corresponded to the rest of the alkaloids extracted from the leaves.

In the third series of "spots" which corresponded to portion C, a small portion of this material was dissolved in ether saturated with formamide and placed in the lower part of the impregnated paper. All the "spots" from fractions A and B were observed in the same respective position. In all, not less than six spots were observed; in the upper part, that of the principal alkaloid at the same level as in portion A and the rest in the respective position as the "spots" of portion B. It was clearly confirmed that the extract of the total alkaloids (portion C) contains the principal alkaloid of portion A, and the rest of the alkaloids of portion B.

Infrared and ultraviolet nuclear magnetic resonance absorption studies

Infrared absorption spectra analysis was conducted with the pure alkaloid using also pure lobeline, a well-known alkaloid, for comparison. A Perkin-Elmer Infrared Instrument, Model 125 was employed as well as Perkin-Elmer Nuclear Magnetic Resonance, 60 megacycles apparatus.

Spectra work showed the presence of benzene rings in 1601, 1587, 1495 and 1452 cm.$^{-1}$, confirmed by the presence of small bands at 3085 and 3005 cm.$^{-1}$.

The band at 1690 cm.$^{-1}$ showed valence vibration of —CO groups, in an R—CO—Ar organization. The band at 3260 cm.$^{-1}$ is due to the presence of —NH group. No $CH_3$ group as in lobeline was indicated nor any —OH group.

Based upon the foregoing studies the empirical formula for the new alkaloid of *L. portoricensis* is believed to be $C_{21}H_{23}NO_2$ with a structural formula:

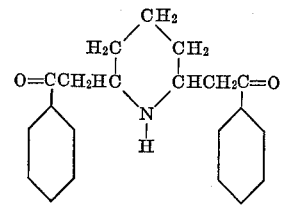

Melting point determination of the principal crystalline alkaloid and of various alkaloidal salts (1) *Melting point of the crystallized alkaloid.*—The melting point of crystals of the alkaloid was determined by a method which utilizes the electrical application of heat to a microscope stage. The melting point determined in this manner for the alkaloid was within the range of 115 to 116° C.

(2) *Alkaloidal hydrochloride and its melting point.*—The alkaloidal hydrochloride was prepared by adding a small but sufficient amount, for complete salt formation, of a solution obtained by mixing hydrochloric acid with an anhydrous ether to a small portion of an ethereal solution of the alkaloid designated as "A" above. Total precipitation of the hydrochloride in crystalline form was obtained and the closed test tube containing the precipitate was allowed to stand until the next day. The ether solution was then decanted carefully to avoid any loss. The crystals were washed by the addition of a small amount of anhydrous ether. The test tube was allowed to stand for a number of hours until the ether layer was clear. The crystals had collected on the bottom and on the sides of the test tube. The ether solution was decanted leaving the crystals in a substantially pure form. The traces of ether remaining were evaporated by permitting the crystals to stand for several hours. The melting point was determined in a manner similar to that as described above. The melting point for the hydrochloride form of the alkaloid was 187 to 188° C.

(3) *Alkaloidal perchlorate and its melting point.*—The alkaloidal perchlorate was prepared by adding a small portion of an alcoholic solution of the alkaloid to a small portion of a solution of perchloric acid sufficient for complete formation of the alkaloid perchlorate. The alkaloidal perchlorate precipitated and was then allowed to stand until the next day. The clear solution was decanted, leaving the crystals on the bottom and on the sides of the test tube. The crystals were washed with a small portion of anhydrous ethyl alcohol which is added slowly so as to avoid any loss of the crystals. The crystals were allowed to dry at a temperature of 35 to 40° C. The melting point, determined as described above, was found to be within the range of 156° C. to 159° C.

(4) *Alkaloidal picrate and its melting point.*—The alkaloidal picrate was prepared by adding slowly to a small portion of an alcoholic solution of the alkaloid, a small portion of an alcoholic saturated solution of picric acid sufficient for the chemical formation of the picrate. An immediate precipitation of the alkaloidal picrate was obtained. The precipitate was carefully warmed in a water bath in order to recrystallize the alkaloidal picrate. The total precipitation of the picrate was allowed to take place leaving the closed test tube until the next day. The solution was decanted leaving the picrate crystals on the bottom and on the walls of the test tube. The crystals in the test tube were washed with a minimum quantity of warmed ethyl alcohol so as to recrystallize them. The clear solution was decanted cautiously over a period of several hours. The crystals were allowed to dry at a temperature of 35 to 40° C. Their melting point determined as described above was found to be 175 to 176° C.

PHARMACOLOGIC STUDIES

Action of the new alkaloid on the respiration and blood pressure

Tests performed on dogs.—Dogs were anesthesized with pentobarbital using 50 mgs. per kg. intravenously and the animals were arranged for respiration and blood pressure records. Twenty mgs. of the alkaloid as prepared above and designated as "A" were dissolved in 20 mls. of distilled water with the aid of an equivalent quantity of tartaric acid. Different doses were injected intravenously. The tests conclusively indicated that the alkaloid stimulates the respiratory center.

Tests performed on cats.—Cats were anesthesized with chloralose, 150 mgs. per kg. Respiration and arterial pressure were recorded when the alkaloidal solution was injected through the femoral vein. Intravenous injection of the alkaloid stimulates the respiration though not so marked as when administered to dogs.

$M.L.D._{50}$ determination.—White mice in sets of six were used. Mice were taken of uniform size each weighing from 20 to 25 gm. The determination was carefully performed and the $M.L.D._{50}$ was found to be 95 mgs.

Additional pharmacological studies indicated that the alkaloids can be administered subcutaneously, intraveable for use with human beings. It was found that the alkaloids can be administered subcutaneously, intravenously or intramuscularly. For the human adult a dosage of 10 mg. has been found to be quite effective when administered intraveneously while a dosage of 40 mg. is particularly effective when administered intramuscularly or subcutaneously.

For infants and children a one-half ampul dosage subcutaneously or intramuscularly injected has been found to be quite effective. The dosages may be administered as frequently as at one-half hour intervals if necessary.

Having thus described my invention, it is quite obvious that certain modifications and variations can be made without departing from the scope or spirit of the invention and it is intended that these deviations be part of the invention as set forth in the appended claims.

I claim:

1. A process of obtaining the principal alkaloid of an endemic plant of Puerto Rico classified as *Tupa portoricensis* Vatke which contains a plurality of alkaloids, said process comprising the steps of
    (a) drying the plant leaves and converting them to a fine powder,
    (b) extracting the dried powder with a mixture of reagents which is a solvent for all of said alkaloids,
    (c) concentrating the resulting extract by evaporation,
    (d) extracting all of said alkaloids from the concentrated extract by adding successive portions of a dilute mineral acid in which the alkaloids are soluble in the form of their alkaloidal salts and filtering each successive portion to eliminate impurities,
    (e) precipitating all of the alkaloids in the acid salt solution with an alkaline reagent by converting them to their insoluble basic alkaloidal form,
    (f) extracting the basic alkaloids with successive portions of a suitable organic solvent,
    (g) further purifying the alkaloids by extracting them with successive portions of a dilute mineral acid, precipitating the alkaloids contained in these portions with an alkaline reagent, then extracting the purified total alkaloids with sulfuric ether, and
    (h) evaporating the sulfuric ether extract of the purified total alkaloids in vacuum at a temperature of from 35° to 40° C. until the volume has been reduced to approximately one-third, after which the evaporation is continued at a temperature of from about 15° to 20° C. until the volume has been reduced to about one-eighth the original volume to thereby crystallize the principal alkaloid, separating the crystallized principal alkaloid from the remaining organic solution containing the rest of the alkaloids and rapidly washing the separated principal alkaloid with a cold portion of sulfuric ether so as to eliminate final impurities of other alkaloids.

2. The process according to claim 1, wherein the mixture of reagents used consists of ammonia water, ethyl alcohol and sulfuric ether.

References Cited

FOREIGN PATENTS

| | | |
|---|---|---|
| 145,621 | 1/1921 | Great Britain. |
| 156,190 | 4/1922 | Great Britain. |

OTHER REFERENCES

The Plant Alkaloids, Henry, T. A., 4th ed., 1949, pp. 22–34.

HENRY R. JILES, Primary Examiner

S. D. WINTERS, Assistant Examiner

U.S. Cl. X.R.

260—236; 424—195